(12) United States Patent
Takahashi et al.

(10) Patent No.: US 10,749,230 B2
(45) Date of Patent: Aug. 18, 2020

(54) METAL-AIR BATTERY UNIT AND METAL-AIR BATTERY

(71) Applicant: FUJIKURA RUBBER LTD., Koto-ku, Tokyo (JP)

(72) Inventors: Masaki Takahashi, Saitama (JP); Tsutomu Narita, Saitama (JP); Yoshiharu Nakajima, Saitama (JP); Hiroshi Sakama, Saitama (JP)

(73) Assignee: FUJIKURA RUBBER LTD., Tokyo (JP)

( * ) Notice: Subject to any disclaimer, the term of this patent is extended or adjusted under 35 U.S.C. 154(b) by 189 days.

(21) Appl. No.: 16/069,610

(22) PCT Filed: Jul. 28, 2016

(86) PCT No.: PCT/JP2016/072229
§ 371 (c)(1),
(2) Date: Jul. 12, 2018

(87) PCT Pub. No.: WO2017/122378
PCT Pub. Date: Jul. 20, 2017

(65) Prior Publication Data
US 2020/0058976 A1    Feb. 20, 2020

(30) Foreign Application Priority Data

Jan. 14, 2016  (JP) .................................. 2016-005190
Feb. 24, 2016  (JP) .................................. 2016-032957

(51) Int. Cl.
*H01M 10/052*    (2010.01)
*H01M 12/02*    (2006.01)
(Continued)

(52) U.S. Cl.
CPC ......... *H01M 12/02* (2013.01); *H01M 2/0255* (2013.01); *H01M 2/1022* (2013.01);
(Continued)

(58) Field of Classification Search
CPC .................... H01M 10/052; H01M 10/0525
See application file for complete search history.

(56) References Cited

U.S. PATENT DOCUMENTS 5,354,625 A  * 10/1994  Bentz ..................... H01M 6/46
                                                 429/407
2012/0115068 A1 * 5/2012  Nakanishi ............. H01M 12/06
                                                 429/498
(Continued)

FOREIGN PATENT DOCUMENTS

JP    S50-14926 A    2/1975
JP    S62-177873 A    8/1987
(Continued)

OTHER PUBLICATIONS

International Search Report for Application No. PCT/JP2016/072229 dated Oct. 20, 2016.

*Primary Examiner* — Olatunji A Godo
(74) *Attorney, Agent, or Firm* — McCormick, Paulding & Huber PLLC

(57) ABSTRACT

An object is especially to provide a metal-air battery unit that has a compact configuration including a water supply space and an electrical system space. The metal-air battery unit of the present invention includes a unit main body including a plurality of metal-air battery cells, a water supply space supplying an electrolyte to the metal-air battery cells and an electrical system space coupling to a positive electrode and a negative electrode of the metal-air battery cell to control a battery output, disposed on an outer surface of the unit main body.

14 Claims, 13 Drawing Sheets

(51) Int. Cl.
*H01M 2/02* (2006.01)
*H01M 2/10* (2006.01)
*H01M 2/36* (2006.01)
*H01M 10/42* (2006.01)
*H01M 12/06* (2006.01)

(52) U.S. Cl.
CPC ......... *H01M 2/361* (2013.01); *H01M 10/425* (2013.01); *H01M 12/06* (2013.01)

(56) References Cited

U.S. PATENT DOCUMENTS

2014/0134438 A1* 5/2014 Gadkaree .............. H01M 4/366
428/402.24
2014/0178776 A1* 6/2014 Mitsuoka .............. H01M 4/134
429/405

FOREIGN PATENT DOCUMENTS

| JP | 2002-151167 A | 5/2002 |
| JP | 3152997 U | 8/2009 |
| JP | 3167289 U | 4/2011 |
| JP | 2012-256547 A | 12/2012 |
| JP | 2013-214472 A | 10/2013 |
| JP | 2013-214473 A | 10/2013 |
| JP | 2014-191861 A | 10/2014 |
| JP | 2015-138772 A | 7/2015 |
| JP | 2016-103442 A | 6/2016 |
| WO | 2012/066962 A1 | 5/2012 |

* cited by examiner

METAL-AIR BATTERY UNIT AND METAL-AIR BATTERY

CROSS-REFERENCE TO RELATED APPLICATIONS

This application is a National Stage application of International Patent Application No. PCT/JP2016/072229 filed on Jul. 28, 2016, which claims priority to Japanese Patent Application Nos. JP2016-005190 filed on Jan. 14, 2016 and JP2016-032957 filed on Feb. 24, 2016, each of which is hereby incorporated by reference in its entirety.

TECHNICAL FIELD

The present invention relates to a metal-air battery unit that includes a plurality of metal-air battery cells, and a metal-air battery.

BACKGROUND ART

In a metal-air battery, oxygen in the atmosphere is used as a positive-electrode active material to perform redox reaction of this oxygen at an air electrode that is a positive electrode. On the other hand, redox reaction of metal is performed at a metal electrode that is a negative electrode. The metal-air battery has a high energy density, thus being expected as a role such as an emergency power supply at the time of disaster or the like. This metal-air battery, which is expected as the role such as the emergency power supply or the like, is configured of a plurality of metal-air battery cells typically corresponding to a desired electricity output, and an injection of an electrolyte into each of the metal-air battery cells starts an electric generation.

Coupling and unitizing the plurality of metal-air battery cells ensures obtaining a desired output. The following patent documents disclose structures of battery units Japanese Patent Publication No. 2013-214472, Japanese Patent Publication No. 2013-214473 and Japanese Patent Publication No. S62-177873.

SUMMARY OF THE INVENTION

Conventionally, a substrate unit that controls a battery output has been disposed separately from a metal-air battery unit. This has caused a problem of an increased size of a whole structure including the metal-air battery unit and the substrate unit. The separately disposed metal-air battery unit and substrate unit have also caused a problem of complication in carrying or the like.

With a configuration where individual water supply spaces are disposed for the respective metal-air battery cells of the metal-air battery unit and a configuration where water is directly supplied to each of the metal-air battery cells, it is necessary to supply water individually, thus causing a complicated water supply operation in an urgent situation, such as at the time of disaster. Additionally, an electrolyte amount supplied to each of the metal-air battery cells easily varies, thus causing a problem where the desired electricity output cannot be obtained.

For example, when a water supply amount is too much, the electrolyte leaks out to an outside of the battery, and in some cases, there has been a possibility of the leaked out electrolyte damaging an electrical system, thus disabling an electric generation. When the water supply amount is too little, there has occurred a problem where the desired electricity output cannot be obtained.

In particular, since it is predicted that the metal-air battery is used in an urgent situation, such as at the time of disaster, it has been required a configuration that enables the electrolyte supply to the plurality of metal-air battery cells to be as easy and quick as possible.

The present invention has been made in consideration of such points, and an object of the present invention is especially to provide a metal-air battery unit that ensures a compact configuration including a water supply space and an electrical system space, and further, ensures a collective water supply.

An object of the present invention is especially to provide a metal-air battery that ensures supplying an electrolyte to a plurality of metal-air battery cells easily and quickly compared with a conventional one.

A metal-air battery unit in the present invention includes a unit main body, a water supply space, and an electrical system space. The unit main body includes a plurality of metal-air battery cells. The water supply space and the electrical system space are disposed on an outer surface of the unit main body. The water supply space supplies an electrolyte to the metal-air battery cells. The electrical system space couples to a positive electrode and a negative electrode of the metal-air battery cell to control a battery output.

In the present invention, it is preferred that the unit main body has a top surface side on which an upper case is installed, and the water supply space and the electrical system space are disposed in the upper case in one body or in the upper cases in separate bodies.

In the present invention, it is preferred that the water supply space is a water supply space shared by the respective metal-air battery cells.

In the present invention, it is preferred that the electrical system space includes a wiring space coupled to the positive electrode and the negative electrode of the metal-air battery cell and a substrate space in which a substrate that controls a battery output is installed.

In the present invention, it is preferred that the metal-air battery cell has a top surface on which a tubular portion including a wiring port from which a wiring coupled to the positive electrode and the negative electrode of the metal-air battery cell is extracted projects into the electrical system space, and the wiring port is positioned higher than a bottom surface of the electrical system space.

In the present invention, it is preferred that the metal-air battery cell has a top surface on which a tubular portion including a wiring port from which a wiring coupled to the positive electrode and the negative electrode of the metal-air battery cell is extracted projects into the electrical system space, and the wiring port is positioned higher than a liquid surface of a fully-filled electrolyte supplied to the water supply space.

A metal-air battery in the present invention includes a unit main body, a water supply space, and a cover. The unit main body includes a plurality of metal-air battery cells. The water supply space is disposed on a top side of the unit main body. The water supply space is shared by the respective metal-air battery cells. The cover has one end with an opening. The cover is configured to house the unit main body through the opening. The cover doubles as a water supply container for the water supply space configured to house an aqueous electrolyte in a state where the cover is removed from the unit main body with the opening facing upward, and the cover has an inner wall surface where a mark to indicate a water supply amount to the water supply space is disposed.

In the present invention, it is preferred that the inner wall surface of the cover has a protrusion that suppresses a rattle of the unit main body.

In the present invention, it is preferred that the protrusion extends toward an insertion direction of the cover to the unit main body.

In the present invention, it is preferred that the mark is a water level line.

In the present invention, it is preferred that the cover includes a water supply handle.

In the present invention, it is preferred that the water supply handles are disposed in respective approximately centers of an opposing left side portion and right side portion of the cover, or the water supply handle disposed in the left side portion is positioned to one side with respect to a center in a width direction of the left side portion and the water supply handle disposed in the right side portion is positioned to another side on an opposite side to the one side with respect to a center in a width direction of the right side portion.

In the present invention, it is preferred that the metal-air battery includes a salt for preparing a salt water as the electrolyte, and the salt has a grain diameter of 300 μm or less.

The metal-air battery unit of the present invention ensures a compact configuration compared with a conventional one by disposing both the water supply space and the electrical system space on the outer surface of the unit main body. The present invention also ensures collectively supplying water to each of the metal-air battery cells.

The metal-air battery of the present invention ensures supplying the electrolyte to the plurality of metal-air battery cells easily and quickly compared with the conventional one.

DETAILED DESCRIPTION

The following describes one embodiment (hereinafter, abbreviated as "the embodiment") of the present invention in detail. The present invention is not limited to the following embodiments and can be performed in various modifications in a range of the gist of the present invention.

Figure 1:
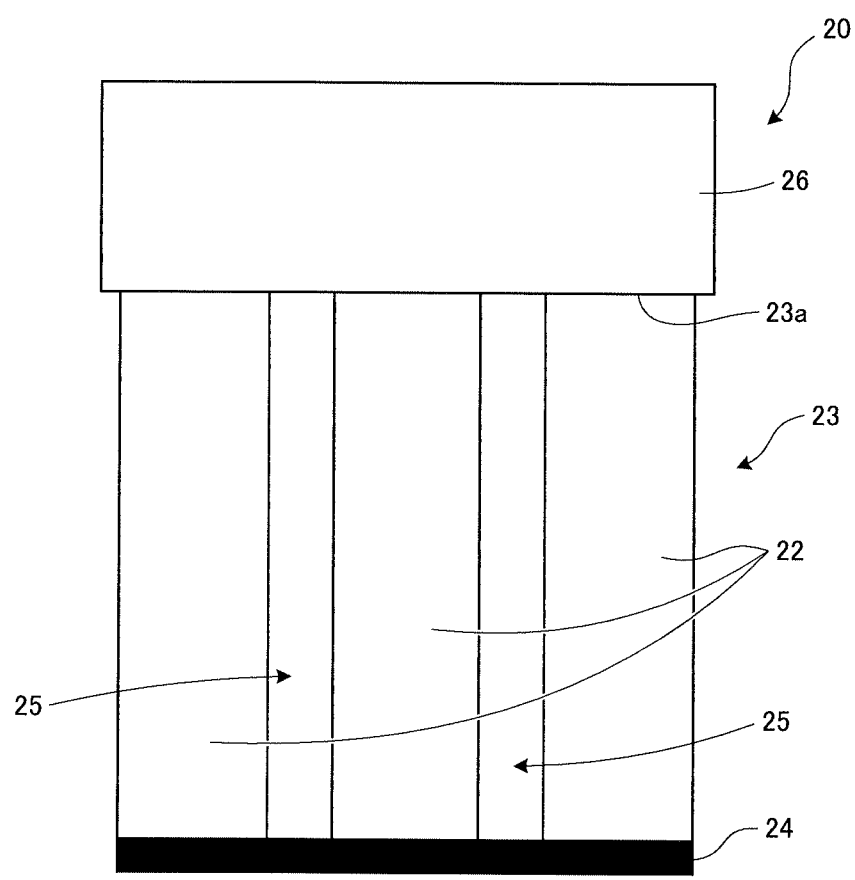
FIG. 1 is a schematic diagram (a front view) of a metal-air battery unit according to an embodiment of the present invention.
Figure 2:
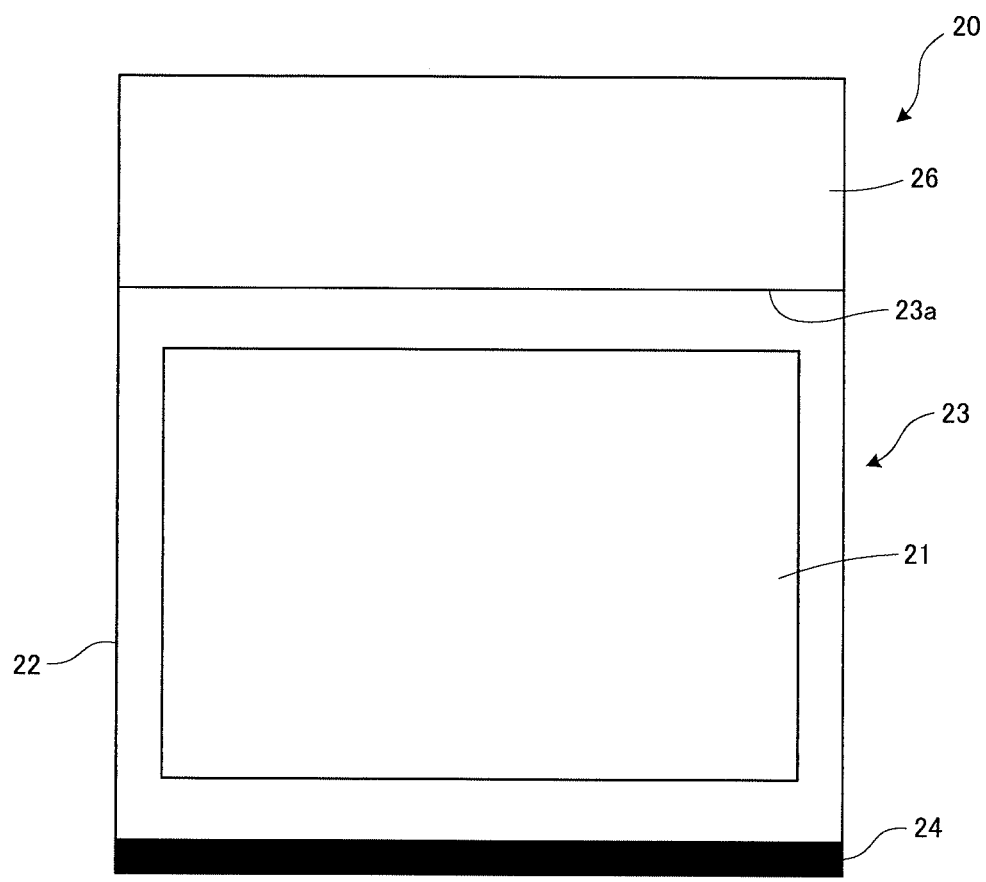
FIG. 2 is a schematic diagram (a side view) of the metal-air battery unit according to the embodiment of the present invention.

FIG. 1 is a schematic diagram (a front view) of a metal-air battery unit according to the embodiment of the present invention. FIG. 2 is a schematic diagram (a side view) of the metal-air battery unit according to the embodiment of the present invention.

As illustrated in FIG. 1, a metal-air battery unit 20 includes a unit main body 23 where a plurality of metal-air battery cells 22 are disposed on a cell pedestal 24. In a configuration illustrated in FIG. 1, a count of the metal-air battery cells 22 is three, but it is not intended to limit the count. Corresponding to a desired electricity output, the count of the metal-air electricity cells 22 that are coupled can be specified. As illustrated in FIG. 1, each of the metal-air battery cells 22 is arranged side by side via spaces 25.

As illustrated in FIG. 2, the unit main body 23 has side surfaces where one of positive electrodes (air electrodes) 21 of the metal-air battery cells 22 positioned in both sides of the unit main body 23 are exposed. Although it is not illustrated, both sides of the unit main body 23 may have protectors disposed. Disposing the protector protects the positive electrode 21 from an outside. At this time, a space is formed between the protector and the positive electrode. This causes the positive electrodes 21 disposed on both sides of respective metal-air battery cells 22 to be in a state of being exposed to the air together with the spaces 25 disposed between the metal-air battery cells 22.

As illustrated in FIG. 1 and FIG. 2, an upper case 26 is installed on a top surface 23a, one of outer surfaces of the unit main body 23.

Figure 3:
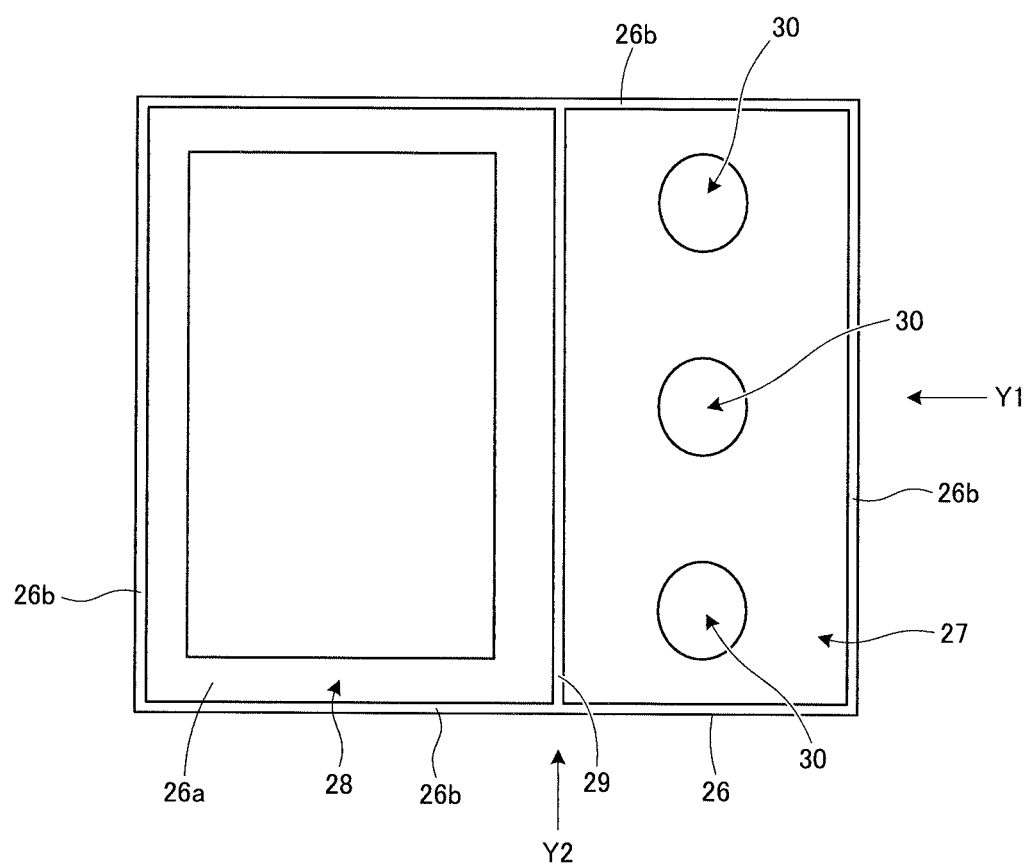
FIG. 3 is a schematic diagram (a top view) of a metal-air battery unit according to a first embodiment of the present invention.

FIG. 3 is a schematic diagram (a top view) of a metal-air battery unit according to a first form of implementation of the present invention. It should be noted that FIG. 1 corresponds to a front view viewed from an Y1 direction illustrated in FIG. 3, and FIG. 2 corresponds to a side view viewed from an Y2 direction illustrated in FIG. 3.

The upper case 26 disposed on the top surface of the unit main body 23 illustrated in FIG. 3 is configured by including a bottom surface 26a and side surfaces 26b disposed upright from respective sides of the bottom surface 26a. As illustrated in FIG. 3, the upper case 26 includes a water supply space 27 that supplies an electrolyte to each of the metal-air battery cells 22 and an electrical system space 28 that electrically couples to a positive electrode and a negative electrode of each of the metal-air battery cells 22 and controls a battery output.

In the first embodiment illustrated in FIG. 3, the water supply space 27 and the electrical system space 28 are disposed in the upper case 26 in one body. Between the water supply space 27 and the electrical system space 28, a wall 29 is disposed upright from the bottom surface 26a. The wall 29 has a height, for example, approximately as high as a height of the side surface 26b. Disposing the wall 29 ensures preventing the electrolyte supplied to the water supply space 27 from flowing to the electrical system space 28.

Figure 4:
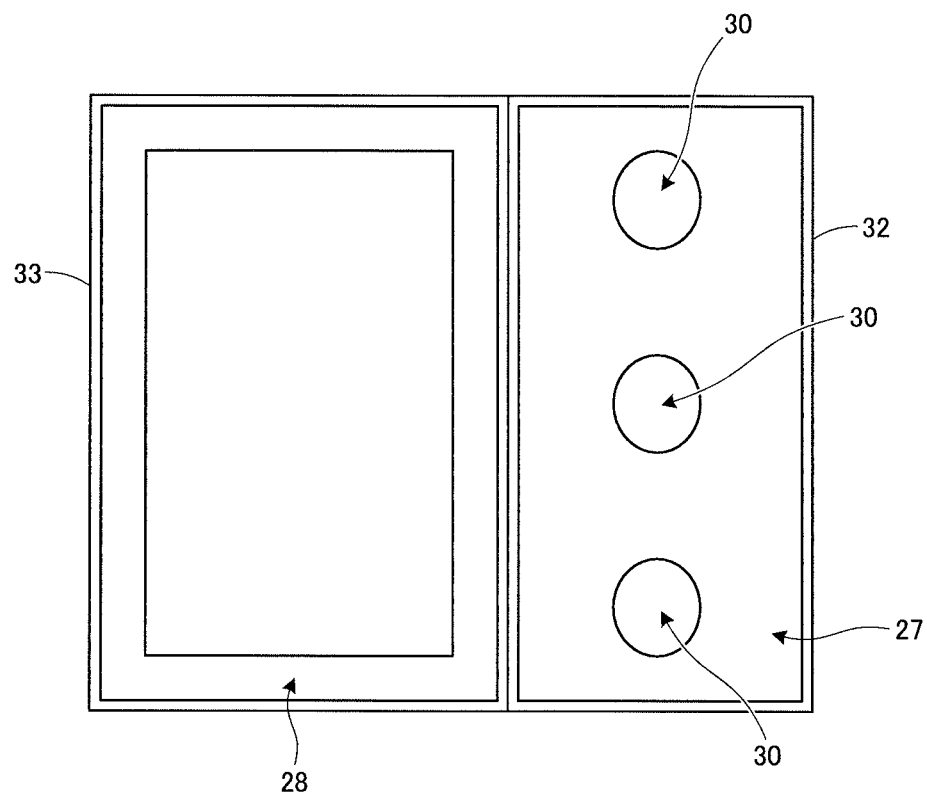
FIG. 4 is a schematic diagram (a top view) of a metal-air battery unit according to a second embodiment of the present invention.

Meanwhile, in a second embodiment illustrated in FIG. 4, the water supply space 27 and the electrical system space 28 are disposed in upper cases 32 and 33 in separate bodies. In FIG. 4, the upper case 32 and the upper case 33 have opposed surfaces in contact, but a clearance may be present between the opposed surfaces between the upper case 32 and the upper case 33.

<Water Supply Space>

Figure 5:
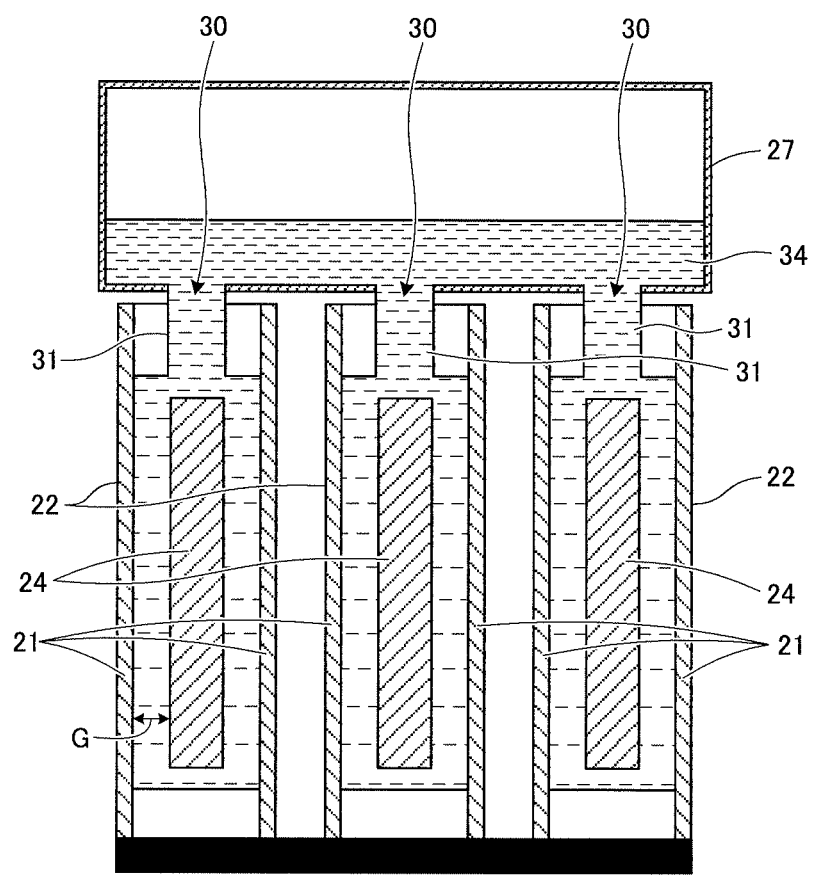
FIG. 5 is a schematic diagram (a vertical cross-sectional view) for describing a water supply space of the metal-air battery unit according to the embodiment of the present invention.

FIG. 5 is a schematic diagram (a vertical cross-sectional view) for describing the water supply space of the metal-air battery unit according to the embodiment of the present invention.

As illustrated in FIG. 3, FIG. 4, and FIG. 5, the water supply space 27 has a bottom surface where a plurality of water supply holes 30 are formed. These water supply holes 30 are coupled to water supply ports 31 (see FIG. 5) formed in the respective metal-air battery cells 22.

Thus, the water supply space 27 is a shared water supply space including the plurality of water supply holes 30 for the respective metal-air battery cell 22. Accordingly, it is possible to collectively supply water to each of the metal-air battery cells 22.

Here, an internal structure of each of the metal-air battery cells 22 will be described. As illustrated in FIG. 5, a negative electrode 24 is arranged inside with respect to the positive electrodes 21. A predetermined interval (a gap) G is disposed between the positive electrode 21 and the negative electrode 24.

As illustrated in FIG. 5, the positive electrode 21 and the negative electrode 24 are opposed via an electrolyte 34. The positive electrode 21 and the negative electrode 24 are both in contact with the electrolyte 34. The electrolyte 34 supplied from the water supply space 27 is injected into the respective metal-air battery cells 22 passing through the respective water supply holes 30. At this time, since this embodiment ensures collectively supplying water to each of the metal-air battery cells 22, approximately identical amounts of the electrolyte 34 can be simultaneously injected to each of the metal-air battery cells 22. Accordingly, a desired electricity output can be obtained stably and sustainably. Collectively supplying water ensures easily and quickly supplying water even in an urgent situation, such as at the time of disaster.

It should be noted that the metal-air battery cell 22 according to the embodiment is not particularly limited, and a known configuration that includes the positive electrode 21 and the negative electrode 24 is applicable.

<Electrical System Space>

A substrate unit conventionally disposed as a different unit from the metal-air battery unit is integrally disposed in the metal-air battery unit 20 as the electrical system space 28 in this embodiment. This can make the metal-air battery unit 20 have a compact configuration compared with a conventional one. At this time, with a configuration where the water supply space 27 and the electrical system space 28 are disposed in the upper case 26 in one body as in the embodiment in FIG. 3, separating each of the spaces 27 and 28 with the wall 29 ensures a configuration where the electrical system is insusceptible to the water supply. Alternatively, as illustrated in FIG. 4, the water supply space 27 and the electrical system space 28 can be disposed in the different upper cases 32 and 33, respectively.

It should be noted that the electrodes of the respective metal-air battery cells 22 may be in a series connection or may be in a parallel connection; thus, the wiring method is not particularly limited.

Figure 6:
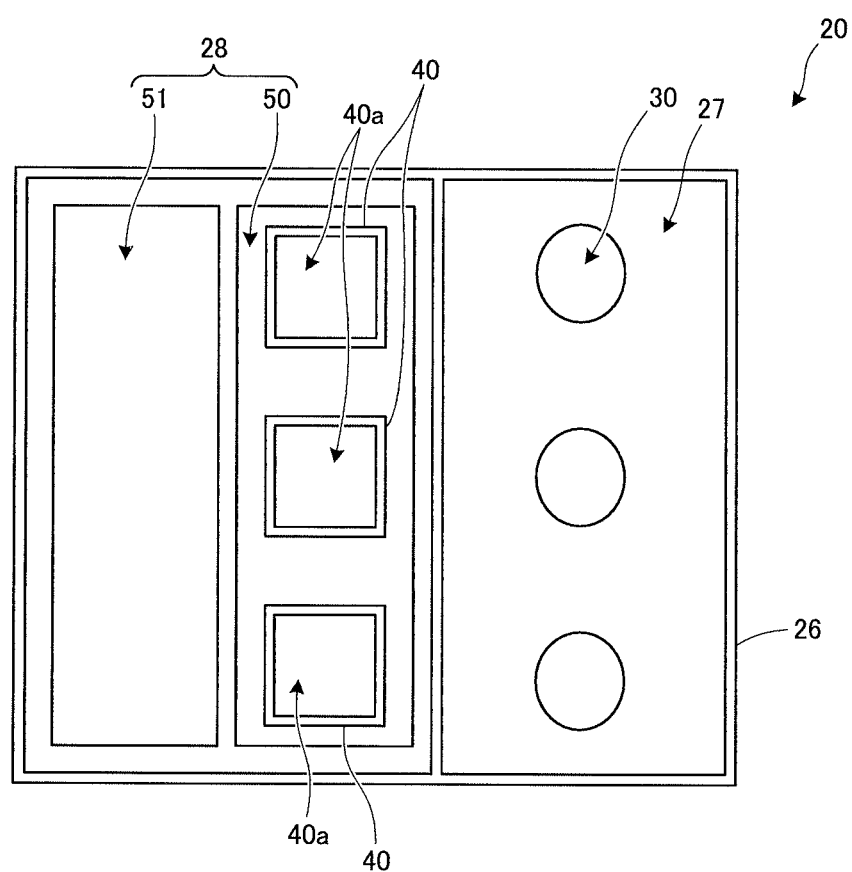
FIG. 6 is a schematic diagram (a top view) of a metal-air battery unit according to a third embodiment of the present invention.
Figure 7:
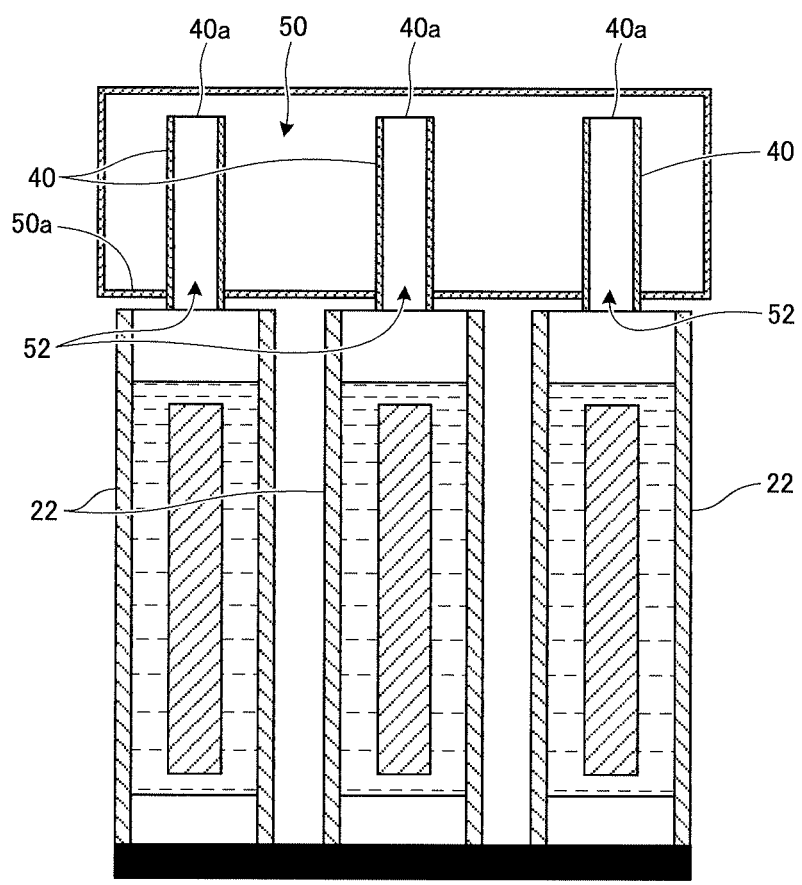
FIG. 7 is a schematic diagram (a vertical cross-sectional view) for describing an electrical system unit of the metal-air battery unit according to the embodiment of the present invention.

FIG. 6 is a schematic diagram (a top view) of a metal-air battery unit according to a third embodiment of the present invention. It should be noted that, while FIG. 6 is a partly changed first embodiment illustrated in FIG. 3, it may have a configuration of a partly changed second embodiment illustrated in FIG. 4. FIG. 7 is a schematic diagram (a vertical cross-sectional view) for describing the electrical system unit of the metal-air battery unit according to the embodiment of the present invention. FIG. 7 is a vertical cross-sectional view based on the configuration in FIG. 6.

As illustrated in the embodiment illustrated in FIG. 6, the electrical system space 28 may be configured to include a wiring space 50 that houses wirings extracted from the metal-air battery cell 22 and a substrate space 51 in which a substrate controlling the battery output is installed. The wirings housed in the wiring space 50 are electrically coupled to the substrate installed in the substrate space 51. The wiring space 50 and the substrate space 51 may be disposed in the upper case in one body as illustrated in FIG. 6 or may be each disposed in different upper cases.

As illustrated in FIG. 6, the wiring space 50 has tubular portions 40 that include wiring ports 40a appearing within the wiring space 50. As illustrated in FIG. 7, the tubular portions 40 are formed on top surfaces of the respective metal-air battery cells 22. As illustrated in FIG. 7, the wiring space 50 has a bottom surface 50a where a plurality of holes 52 are formed. Then, the plurality of tubular portions 40 pass through the respective holes 52 and appear within the wiring space 50. The wiring coupled to the positive electrode 21 and the negative electrode 24 is extracted from each of the wiring ports 40a. The wiring port 40a is positioned higher than the bottom surfaces of the wiring space 50 and the substrate space 51.

Setting the wiring port 40a to be positioned higher than the bottom surface of the electrical system space 28 ensures effectively discharging hydrogen even when the hydrogen is generated by a side reaction in a battery reaction. It may be configured to additionally dispose a hydrogen discharge port.

The wiring port 40a is assumed to be positioned higher than a liquid surface of the fully-filled electrolyte supplied to the water supply space 27 (see FIG. 6). This ensures preventing the electrolyte from entering the wiring port 40a.

In the above-described embodiment, while the water supply space 27 and the electrical system space 28 are both disposed in the upper case (reference numeral 26 in FIG. 3 and reference numerals 32 and 33 in FIG. 4), it is possible to, for example, dispose the water supply space 27 in the upper case and dispose the electrical system space 28 on an outer surface of the unit main body. However, integrally or individually disposing the water supply space 27 and the electrical system space 28 in the upper case ensures a configuration of the metal-air battery unit 20 that is compact and has a decreased count of components.

Figure 8:
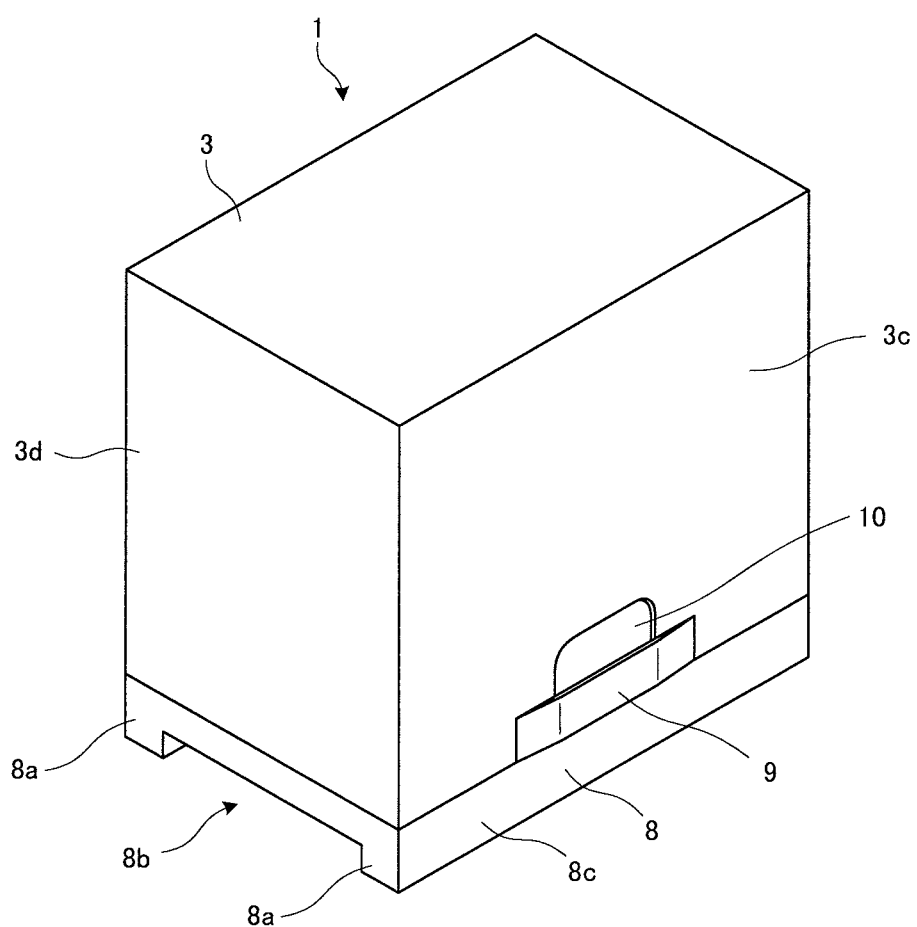
FIG. 8 is a perspective view of the metal-air battery according to the embodiment of the present invention.
Figure 9:
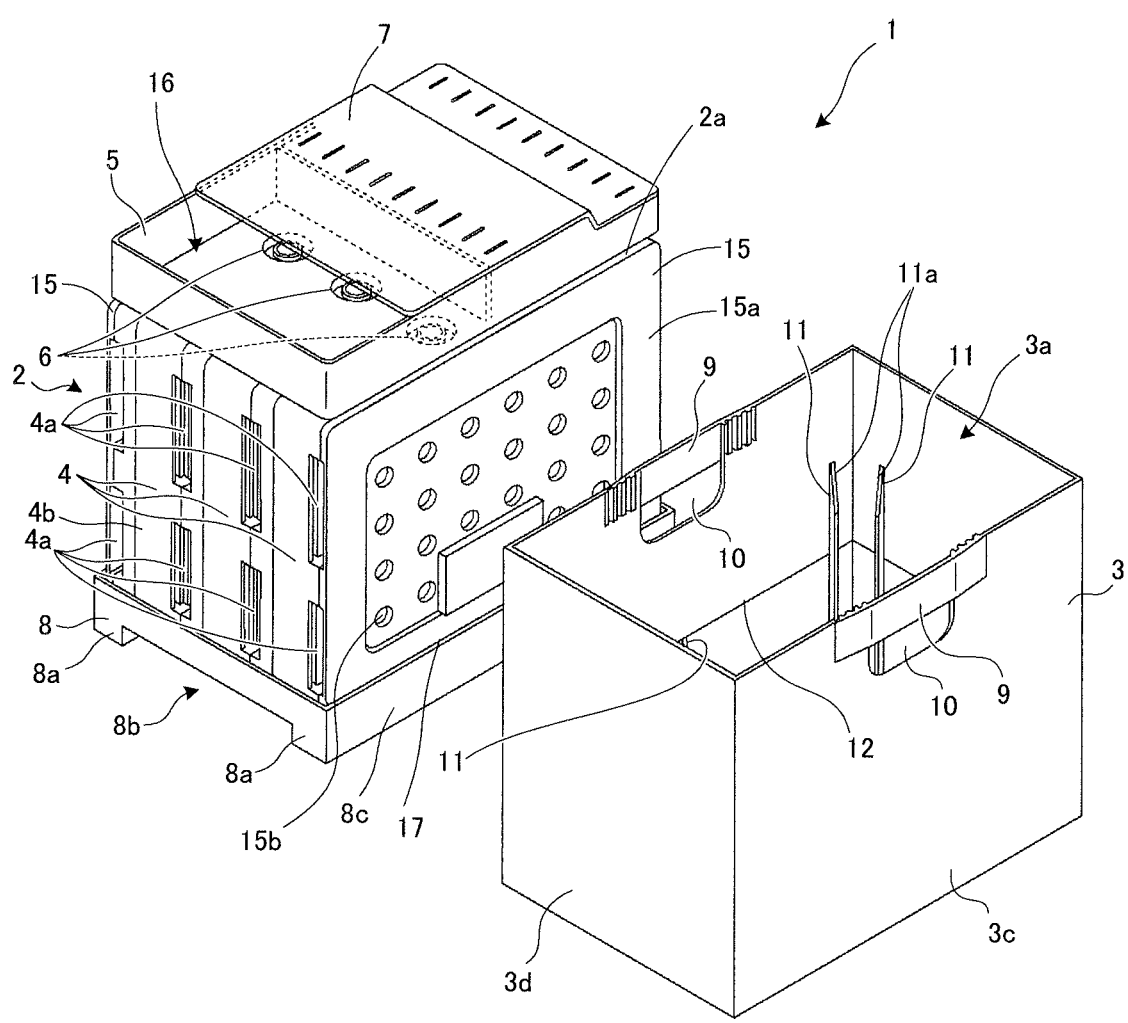
FIG. 9 is a perspective view illustrating a state where a cover illustrated in FIG. 8 is removed.

Next, FIG. 8 is a perspective view of the metal-air battery according to the embodiment of the present invention. FIG. 9 is a perspective view illustrating a state where the cover illustrated in FIG. 8 is removed.

As illustrated in FIG. 8 and FIG. 9, a metal-air battery 1 is configured to include a unit main body 2 including a plurality of metal-air battery cells 4 and a cover 3 configured to house the unit main body 2.

As illustrated in FIG. 8, while the metal-air battery 1 has an outer shape in an approximately rectangular parallelepiped shape, this is one example and not intended to limit the shape.

<Unit Main Body>

In FIG. 9, it is illustrated the unit main body 2 in a state where the cover 3 is removed from the metal-air battery 1 in FIG. 8 and the cover 3. As illustrated in FIG. 9, the plurality of metal-air battery cells 4 that configure the unit main body 2 are disposed on a cell pedestal 8. It should be noted that the unit main body 2 illustrated in FIG. 9 is an example that illustrates the unit main body 2 illustrated in FIG. 1 more specifically.

In the embodiment illustrated in FIG. 9, the cell pedestal 8 has a lower surface side where a plurality of legs 8a are disposed away toward both sides. Between each of the legs 8a, there are disposed clearances 8b from which a user of the metal-air battery 1 can insert his or her hands. In view of this, the user can easily carry the metal-air battery 1 in a state where the cover 3 is installed as illustrated in FIG. 8 and the unit main body 2 in a state where the cover 3 is removed as illustrated in FIG. 9 by putting the hands in the clearances 8b of the cell pedestal 8. However, it is not intended to particularly limit an installation position and a shape of a depressed portion, a clearance, a handle, or the like that serve as a grip portion for carrying in the embodiment.

As illustrated in FIG. 9, the cell pedestal 8 has outer surfaces 8c that protrude slightly outward with respect to outer surfaces 4b of the respective metal-air battery cells 4 and outer surfaces 15a of protectors 15 described below. In view of this, a level difference 17 is formed between the outer peripheral surfaces 8c of the cell pedestal 8, and the outer surfaces 4b of the respective metal-air battery cells 4 and the outer surfaces 15a of the protectors 15. It should be noted that, while in the embodiment, the level difference 17 serves as a portion onto which the cover 3 abuts when the cover 3 covers the unit main body 2 as described later, another cover installing structure without disposing the level difference 17 may be possible.

In the configuration illustrated in FIG. 9, the count of the metal-air battery cells 4 are three, but it is not intended to limit the count. Corresponding to a desired electricity output, the count of the metal-air battery cells 4 that are coupled can be specified. As illustrated in FIG. 9, each of the metal-air battery cells 4 is arranged side by side via spaces 4a.

As illustrated in FIG. 9, the protectors 15 are disposed on the outer surfaces of the metal-air battery cells 4 arranged in both sides. At this time, the spaces 4a are disposed between the protectors 15 and the metal-air battery cells 4. As illustrated in FIG. 9, disposing the spaces 4a between each of the metal-air battery cells 4 and between the metal-air battery cells 4 and the protectors 15 causes the positive electrodes (the air electrodes) disposed in both outer sides of each of the metal-air battery cells 4 to be in a state of being exposed to the air. The protector 15 has a plurality of air holes 15b. Disposing the air holes 15b causes the positive electrodes (the air electrodes) to be exposed to the air more. It should be noted that, forming the air hole 15b is not necessary and presence/absence of the air hole 15b can be conveniently determined. It should be noted that disposing the protectors 15 ensures protecting the positive electrodes, which are in the outer sides of the metal-air battery cells 4 positioned in both sides, from the outside, thus being preferred; but disposing the protector 15 or not is optional.

As illustrated in FIG. 9, the unit main body 2 has a top side 2a on which an upper case 5 is installed. As illustrated in FIG. 9, the upper case 5 includes a water supply space 16 shared by the respective metal-air battery cells 4. The water supply space 16 includes a plurality of water supply holes 6. The water supply holes 6 communicate with the respective metal-air battery cells 4.

As illustrated in FIG. 9, the upper case 5 has a top surface where a lid 7 is disposed. The lid 7 does not cover the whole top surface of the upper case 5 and is installed such that at least a part of the water supply space 16 is in a state of being exposed to the outside. Accordingly, it is possible to supply an aqueous electrolyte from the water supply space 16, which is opened to the outside. Then, the electrolyte supplied to the water supply space 16 is injected to the respective metal-air battery cells 4 from the respective water supply holes 6.

<Cover>

Figure 10A:
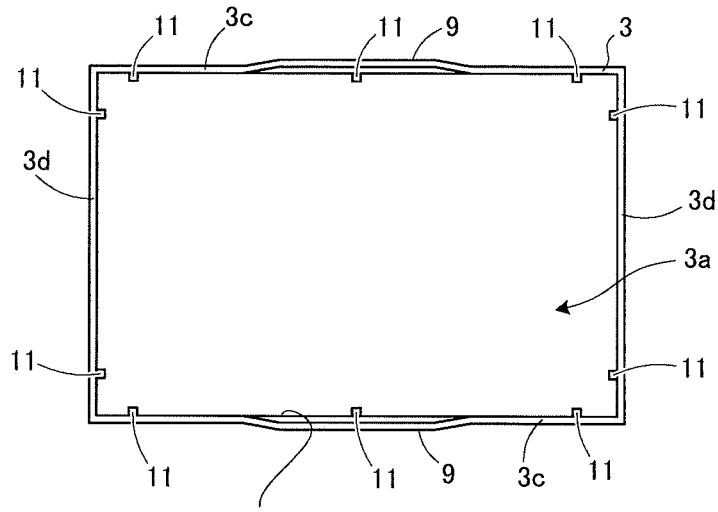
FIG. 10A is a plan view of the cover according to the embodiment of the present invention.
Figure 10B:
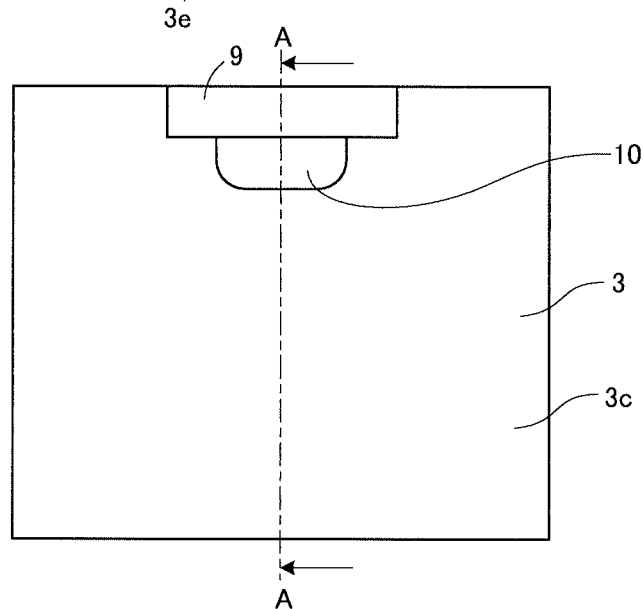
FIG. 10B is a side view of the cover.
Figure 10C:
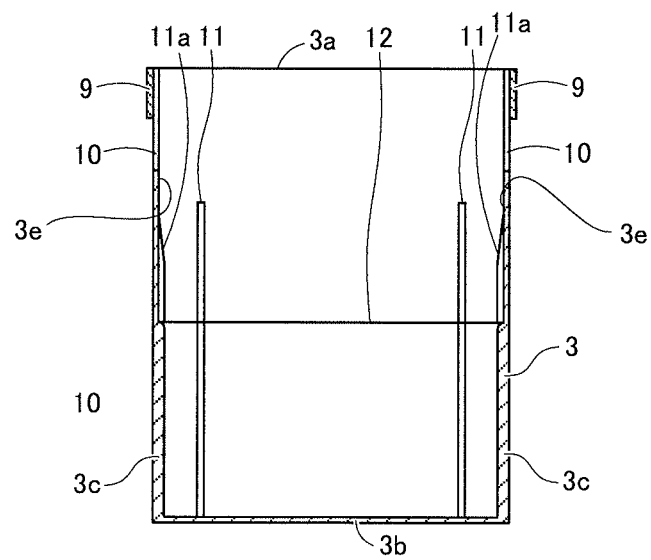
FIG. 10C is a cross-sectional view taken along a line A-A and viewed from an arrow direction illustrated in FIG. 10B.

FIG. 10A is a plan view of the cover according to the embodiment of the present invention. FIG. 10B is a side view of the cover. FIG. 10C is a cross-sectional view taken along a line A-A and viewed from an arrow direction illustrated in FIG. 10B. The cover 3 illustrated in FIG. 9 and FIG. 10 is a view in which the cover 3 illustrated in FIG. 8 is removed from the unit main body 3 and an opening 3a of the cover 3 faces upward.

As illustrated in FIG. 9, FIG. 10A, and FIG. 10C, the cover 3 includes a bottom portion 3b and side portions 3c and 3d surrounding a peripheral area of the bottom portion 3b. Then, a top surface side opposing the bottom portion 3b is opened. Thus, the cover 3 is formed into a bottomed box shape having the opening 3a at one end. Then, passing the opening 3a of the cover 3 through from above the unit main body 2 in a state where the opening 3a faces downward ensures housing upper and side portions of the unit main body 2 within the cover 3.

As illustrated in FIG. 9, FIG. 10B, and FIG. 10C, a pair of the side portions 3c opposing one another of the cover 3 have cutout holes 10 formed to communicate with the opening 3a. Each of the cutout holes 10 is formed in an upper central position in a width direction of the side portion 3c. Water supply handles 9 are disposed so as to cover opening side end portions of the cutout holes 10. The water supply handles 9 are formed so as to slightly project outward with respect to outer surfaces of the side portions 3c. The water supply handles 9 may be integrally formed with the side portions 3c or may be disposed as a separated body. As illustrated in FIG. 9, a part of the cutout hole 10 appears below the water supply handle 9. The user can put the hands into the respective cutout holes 10 to grasp the respective water supply handles 9 with both hands.

As illustrated in FIG. 10A and FIG. 10C, inner wall surfaces 3e of the cover 3 have a plurality of protrusions 11 disposed for suppressing a rattle of the unit main body 2. The protrusions 11 may be disposed integrally with the inner wall surfaces 3e or may be disposed as separate bodies. As illustrated in FIG. 9 and FIG. 10C, the protrusions 11 are formed into a rib shape from the bottom portion 3b of the inner wall surfaces 3e toward a direction of the opening 3a (an insertion direction of the cover 3 to the unit main body 2). The protrusion 11 has a distal end in a side of the opening 3a. An inclined surface 11a that tapers toward the distal end direction is formed on the distal end. In this embodiment, as illustrated in FIG. 10A, the plurality of respective protrusions 11 are disposed near both corners of each of the side portions 3c and 3d and center positions of the side portions 3c where the water supply handles 9 are disposed. However, the formation positions of the protrusions 11 illustrated in FIG. 9 and FIG. 10 are one example and not intended to limit the formation positions. The protrusion 11 is not necessarily in the rib shape, and for example, length dimensions of the protrusion 11 are not intended to be limited.

Figure 11:
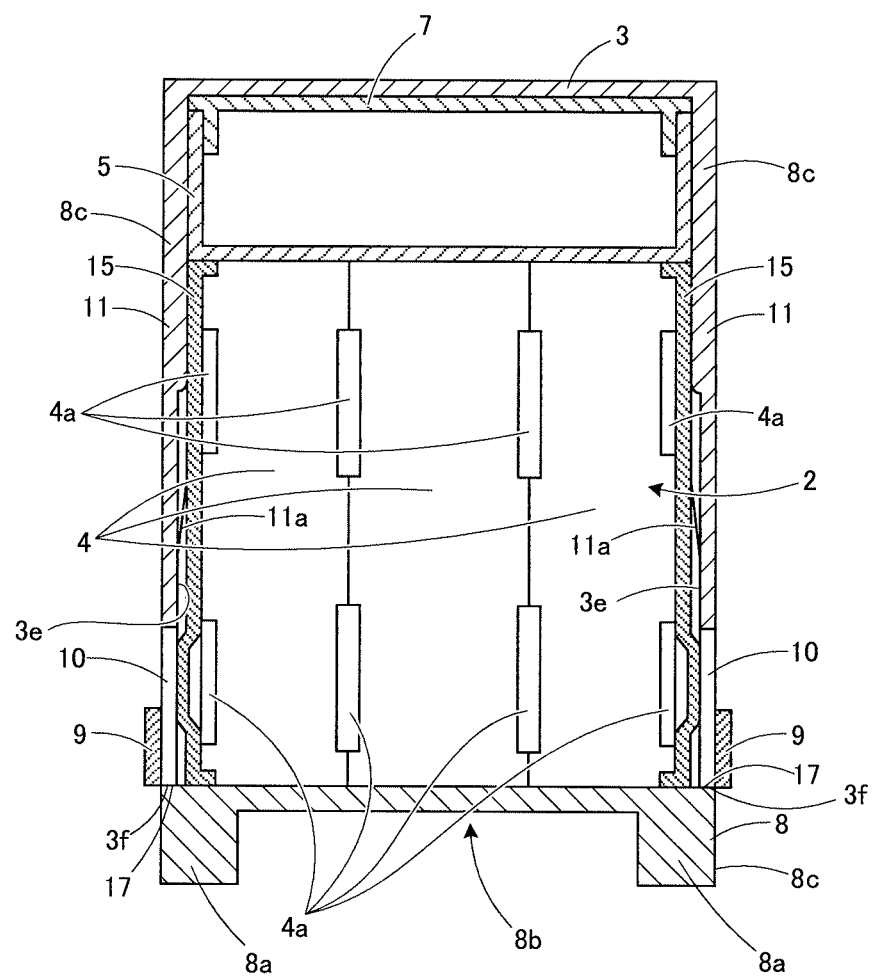
FIG. 11 schematically illustrates a cross-sectional view of the metal-air battery according to the embodiment of the present invention.

FIG. 11 schematically illustrates a cross-sectional view of the metal-air battery according to the embodiment of the present invention. While FIG. 11 illustrates a cross-sectional view that is taken at a position similar to that in FIG. 10B, for example, internal structures of the respective metal-air battery cells 4 and internal shape or the like of the upper case 5 are omitted from the drawing.

As illustrated in FIG. 11, when the cover 3 covers the unit main body 2 from above, the outer surfaces of the unit main body 2 abut on the protrusions 11 disposed on the inner wall surfaces 3e of the cover 3 or the unit main body 2 is housed within the cover 3 in a state where only slight clearances are made between the protrusions 11 and the outer surfaces of the unit main body 2.

At this time, the distal end of the protrusion 11 having the inclined surface 11a ensures smoothly housing the unit main body 2 within the cover 3 along a surface of the protrusion 11. As illustrated in FIG. 11, an opening side edge portion 3f of the cover 3 abuts on the level difference 17 (see also FIG. 9) formed between the outer surfaces 8c of the cell pedestal 8 and the outer surfaces 15a of the protectors 15. This ensures stably installing the cover 3. In this embodiment, as illustrated in FIG. 8 and FIG. 11, the outer surfaces of the side portions 3c and 3d of the cover 3 and the outer surfaces 8c of the cell pedestal 8 are approximately on an identical surface, but the design can be changed.

The cover 3 is preferred to be formed of a resin, but it is not intended to limit the material.

The cover 2 in the embodiment also combines a water supply container for the water supply space 16 that can house the aqueous electrolyte.

As illustrated in FIG. 9 and FIG. 10C, the inner wall surfaces 3e of the cover 3 includes a water level line 12 as a mark to indicate a water supply amount to the water supply space 16.

The aqueous electrolyte, for example, is dissolution of a salt, such as a dietary salt (NaCl) and KCl, in a water. For example, a bagged predetermined amount of dietary salt is housed within the water supply space 16. In describing a generating method for the electrolyte, first, the user removes the cover 3 and puts the opening 3a of the cover 3 into a state of facing upward as in FIG. 9. Next, the bagged dietary salt is taken out from the water supply space 16 and the dietary salt inside the bag is put into the cover 3 in FIG. 9. Subsequently, the water is poured into the cover 3 and the water supply is stopped when the water reaches the water level line 12. Then, the salt water is mixed with a stirring rod or the like. This ensures obtaining a predetermined concentration of salt water. It should be noted that, the stirring rod or the like can be housed within the metal-air battery by request. It is not intended to particularly limit a housing position of the stirring rod, but, for example, by disposing a housing position inside the cell pedestal 8, the stirring rod may be housed in this housing space or the stirring rod may be additionally attached. Besides the stirring rod, the bagged dietary salt or the like described above can be housed within the housing space of the cell pedestal 8. That is, the cover 3 is removed as in FIG. 9, and further, the cell pedestal 8 is removed from the unit main body 2. Then, the stirring rod, the bagged dietary salt, or the like housed in the housing space of the cell pedestal 8 are taken out and the cover 8 is used as the water supply container of the electrolyte to generate the electrolyte. Thus, the cell pedestal 8 serves as a shared pedestal of each of the metal-air battery cells 4 and the inside of the cell pedestal 8 serves as a space in which the stirring rod or the like in generating the electrolyte can be housed.

Then, the user grasps the water supply handles 9 with both hands to supply the electrolyte from the inside of the cover 3 into the water supply space 16. The electrolyte is injected into each of the metal-air battery cells 4 from the water supply hole 6. This ensures obtaining a desired electricity output stably and sustainably from the metal-air battery 1.

The mark to indicate the water supply amount to the water supply space 16 may be in a form other than the water level line 12. For example, the mark can be indicated by a point, an extruding portion, a depressed portion, or the like. However, the indication of the mark in a line is easy for determining the water level and easy to put the mark on the inner wall surface 3e of the cover 3, thus being preferred. It should be noted that the water level line 12 may be drawn around a whole circumference of the inner wall surfaces 3e of the cover 3 or may be drawn only at a part. The water level line 12 may be marked with a scale.

Although it is not illustrated, the outer surfaces of the side portions 3c and 3d of the cover 3 can display an explanation and an explanatory diagram that explains a method for using the metal-air battery (for example, a method for making the electrolyte and a method for supplying water). At this time, it is preferred that the display is easily seen even in either directions of a direction in a state where the cover 3 covers the unit main body 2, that is, the opening 3a of the cover 3 faces downward, or a direction where the cover 3 is removed and the opening 3a of the cover 3 is turned upside down to face upward as in FIG. 9. For example, making the outer surface of one side portion 3c of the cover 3 display for the direction where the opening 3a of the cover 3 faces downward, and making the outer surface of another side portion 3c of the cover 3 display for the direction where the opening 3a of the cover 3 faces upward ensure an easily seen display in any directions.

As described above, the cover 3 in the embodiment doubles as a housing cover for the unit main body 2 and a water supply container for the water supply space 16. The top side 2a of the unit main body 2 includes the water supply space 16 shared by the respective metal-air battery cell 4. Then, the inner wall surfaces 3e of the cover 3 include the mark to indicate the water supply amount to the water supply space 16. In view of this, the user can easily and appropriately generate the predetermined amount of aqueous electrolyte using the mark as an indication in the cover 3. Then, supplying the electrolyte into the shared water supply space 16 from the inside of the cover 3 ensures collectively supplying water into each of the metal-air battery cell 4. At this time, since the predetermined amount of the electrolyte can be injected into the water supply space 16 from the cover 3, it is possible to prevent an adverse effect on the electrical system (in some cases, disables actuating the battery) caused by too much electrolyte leaking out of each of the metal-air battery cell 4 and a failure in obtaining a predetermined output caused by too little electrolyte.

In particular, in an emergency, such as at the time of disaster, it is required to quickly supplying water to actuate the battery. In the embodiment, the predetermined amount of electrolyte can be generated using the cover 3 as a component of the metal-air battery and can be collectively supplied to each of the metal-air battery cells 4, thereby ensuring a prompt action.

Figure 12:
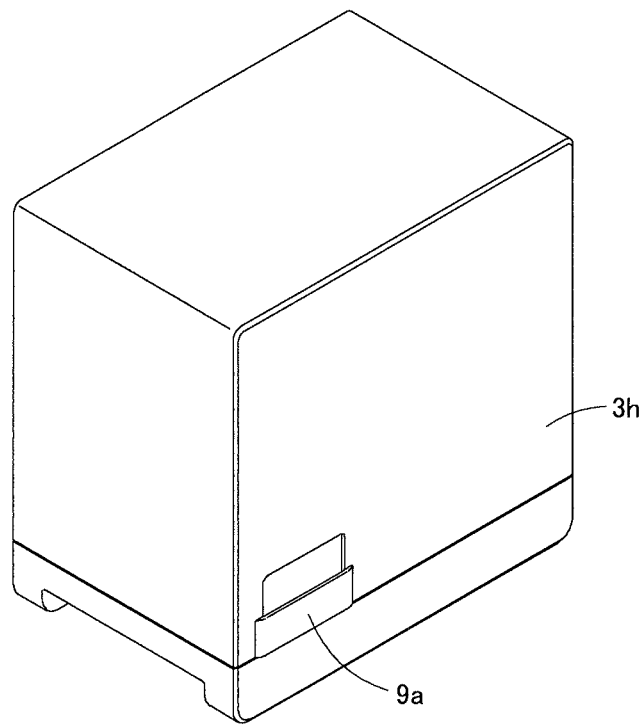
FIG. 12 is a perspective view of a metal-air battery showing a different embodiment from FIG. 8.
Figure 13:
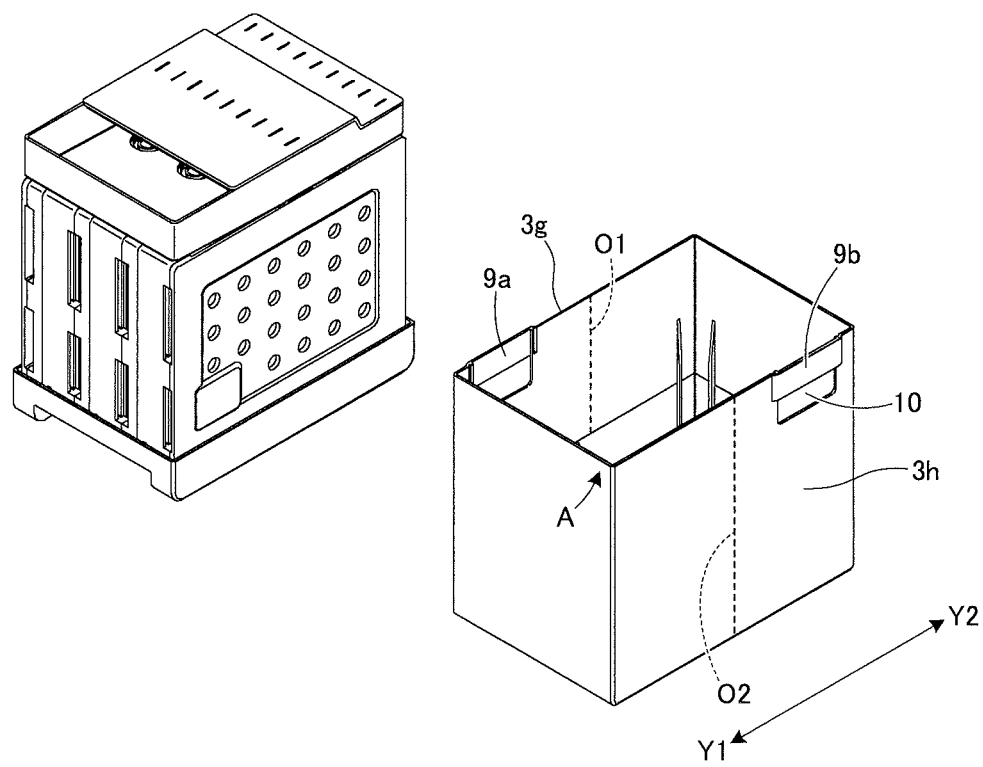
FIG. 13 is a perspective view illustrating a state where a cover illustrated in FIG. 12 is removed.

FIG. 12 is a perspective view of a metal-air battery showing a different embodiment from FIG. 8. FIG. 13 is a perspective view illustrating a state where a cover illustrated in FIG. 12 is removed.

In the embodiment illustrated in FIG. 12 and FIG. 13, the positions of the water supply handles 9 of the cover 3 are different unlike FIG. 8 and FIG. 9. That is, in the embodiment illustrated in FIG. 8 and FIG. 9, the water supply handles 9 are disposed in approximately centers in the width directions of the side portions 3c of the cover 3. For the electrolyte inside the cover 3, while the water supply handles 9 are grasped and one side portion 3c side is slightly inclined to face downward, the electrolyte inside the cover 3 is poured into the water supply space 16. Thus inclining one side portions 3c side slightly downward is because an opening width of the water supply space 16 is slightly wider than a width between the water supply handles 9 of the cover 3. Unless being poured like this, the electrolyte cannot be injected well.

At this time, in the case where the water supply handles 9 are disposed in the approximately centers of the side portions 3c of the cover 3, the water supply handles 9 are easily to hold when both hands grasp the water supply handles 9, thereby ensuring an easy water supply.

Meanwhile, in the embodiment illustrated in FIG. 12 and FIG. 13, water supply handles 9a and 9b, which are disposed in an opposing left side portion 3g and right side portion 3h of the cover 3, respectively, are configured to be disposed in opposite directions of one another. That is, as illustrated in FIG. 12 and FIG. 13, the water supply handle 9a disposed in the left side portion 3g is positioned in an Y1 side with respect to a center O1 in the width direction of the left side portion 3g, and on the other hand, the water supply handle 9b disposed in the right side portion 3h is positioned in an Y2 side with respect to a center O2 in the width direction of the right side portion 3h.

Thus, disposing the water supply handles 9a and 9b, which are disposed in the opposing side portions 3g and 3h, in the opposite directions ensures appropriately preventing a failure of leaking electrolyte from the cutout holes 10 even though, for example, the water is supplied in a state where the right side portion 3h is inclined slightly downward as long as the electrolyte is supplied into the water supply space 16 from a corner portion A in a side away from the water supply handle 9b.

<Average Grain Diameter of Salt>

Subsequently, a description will be given of an average grain diameter of salt (dietary salt). In the embodiment, for example, the bagged predetermined amount of dietary salt is housed within the water supply space 16, and the average grain diameter of this dietary salt was set to 300 µm or less. Preferably, it is 260 µm or less. For a lower limit value, it is preferred to have the average grain diameter of 10 µm or more, and it is more preferable to have the average grain diameter of 20 µm or more.

Figure 14:
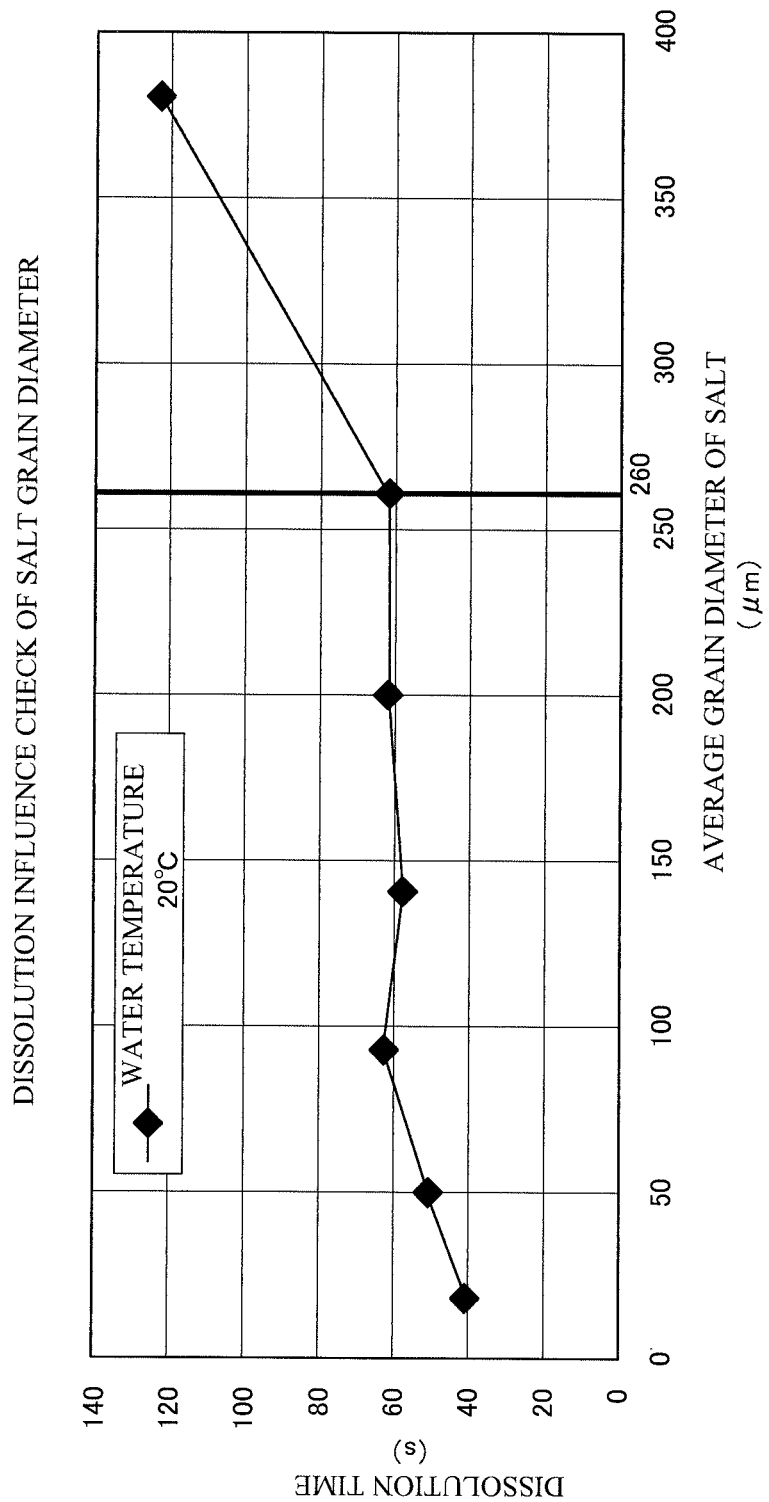
FIG. 14 is a graph showing a relation between an average grain diameter and a dissolution time of a salt.

FIG. 14 is graph showing the relation between the average grain diameter of salt and a dissolution time. In the experiment, 45 g of salt was added into a beaker, and then 300 ml of tap water adjusted to be approximately 20° C. was added. At the point when adding tap water was finished, stirring with a stirrer (a stirring speed; scale 3) and a time measurement were started. It should be noted that salinities are approximately 13% in every sample and, for example, the salinity of this level ensures setting the concentration of the actual electrolyte. Then, for average grain diameter differences, the time it takes to melt the salt was measured and compared.

As illustrated in FIG. 14, when the average grain diameter is approximately 260 µm or less, it was found that the dissolution time was able to be shortened to be approximately 1 minute or less and tends to easily dissolve.

In this embodiment, setting a grain diameter of salt to be 300 µm or less ensures speeding up the dissolution speed even in a low temperature; therefore, the metal-air battery 1 of the embodiment can be promptly used for an emergency power supply or the like. In order to increase the dissolution speed, one thing to do is to increase a water temperature, and another thing to do is to decrease the average grain diameter of salt. However, decreasing the salt down to too small an average grain diameter causes the salt to easily contain humidity and the volume is increased; thus, in the embodiment, the average grain diameter was preferably set to 10 µm or more.

There also is a method for preparing a salt water by putting the salt in a tea bag. However, in this case, fining the average grain diameter of salt down tends to cause the dissolution time to be lengthened in contrast. In view of this, in order to increase the dissolution speed even in the low temperature, it is preferred to take a method in which the salt having the average grain diameter of 300 µm or less is bagged and stored, the salt is taken out of the bag and the water is added to the salt, and then mixed using the stirring rod. Here, the low temperature means a water temperature of less than 40° C.

The "average grain diameter" is measured with a laser diffraction particle size distribution measuring apparatus (by a wet method) and by a sieving method (a Ro-Tap method). Here, MT3300EXII manufactured by MicrotracBEL Corp. was used for the laser diffraction particle size distribution measuring apparatus. The "average grain diameter" means a median diameter (d50) obtained based on a particle size distribution of a volume criteria converted into a sphere-equivalent diameter with the laser diffraction particle size distribution measuring apparatus. It should be noted that, the laser diffraction particle size distribution measuring apparatus (the wet method) was used in the measurement of two points where the grain diameters are small shown in FIG. 14. The measurement procedure is as follows. a) A sample is added to a special grade ethanol to make a saturated ethanol solution. b) A blank measurement is performed using the saturated ethanol solution as a blank. c) The sample is added to the saturated ethanol solution, and a measurement is performed after ultrasonic dispersion.

On the other hand, the sieving method (the Ro-Tap method) was used in the measurement of the grain diameters other than the above-described two points where the grain diameters are small. The sieving method is a measurement in accordance with Japanese Industrial Standard Z 8815 and precautions are in accordance with Japanese Industrial Standard M 8100.

The metal-air battery unit of the present invention ensures a compact structure with which the water supply space and a battery control substrate can be installed in the unit main body itself. The metal-air battery of the present invention ensures promptly supplying the electrolyte to the plurality of metal-air battery cells. Accordingly, the metal-air battery unit and the metal-air battery of the present invention are effectively applicable as, for example, an emergency power supply at the time of disaster or the like.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery unit comprising:
a unit main body that includes a plurality of metal-air battery cells; and
a water supply space and an electrical system space disposed on an outer surface of the unit main body, the water supply space supplying an electrolyte to the metal-air battery cells, the electrical system space coupling to a positive electrode and a negative electrode of each metal-air battery cell to control a battery output,
wherein the water supply space is provided on a top surface side of the unit main body, and the water supply space includes a plurality of water supply holes that communicably connect with each respective metal-air battery cell, and
wherein the electrolyte can be collectively supplied into each metal-air battery cell from the water supply space via the water supply holes.

2. The metal-air battery unit according to claim 1, wherein an upper case is installed on the top surface side of the unit main body, and the water supply space and the electrical system space are disposed in the upper case in one body.

3. The metal-air battery unit according to claim 1, wherein the water supply space is a water supply space shared by the respective metal-air battery cells.

4. The metal-air battery unit according to claim 1 wherein the electrical system space includes a wiring space coupled to the positive electrode and the negative electrode of the metal-air battery cell and a substrate space in which a substrate with controls for battery output can be installed.

5. The metal-air battery unit according to claim 1, wherein the metal-air battery cell has a top surface on which a tubular portion including a wiring port from which a wiring coupled to the positive electrode and the negative electrode of the metal-air battery cell is extracted projects into the electrical system space, and the wiring port is positioned higher than a bottom surface of the electrical system space.

6. The metal-air battery unit according to claim 1, wherein the metal-air battery cell has a top surface on which a tubular portion including a wiring port from which a wiring coupled to the positive electrode and the negative electrode of the metal-air battery cell is extracted projects into the electrical system space, and the wiring port is positioned higher than an electrolyte of a fully-filled electrolyte supplied to the water supply space.

7. A metal-air battery comprising:
a unit main body that includes a plurality of metal-air battery cells;
a water supply space disposed on a top side of the unit main body, the water supply space being shared by the respective metal-air battery cells; and
a cover that has one end with an opening, the cover being configured to house the unit main body through the opening, wherein
the cover doubles as a water supply container for the water supply space configured to house an aqueous electrolyte in a state where the cover is removed from the unit main body with the opening facing upward, and the cover has an inner wall surface where a mark to indicate a water supply amount to the water supply space is disposed.

8. The metal-air battery according to claim 7, wherein the inner wall surface of the cover has a protrusion that suppresses a rattle of the unit main body.

9. The metal-air battery according to claim 8, wherein the protrusion extends toward an insertion direction of the cover to the unit main body.

10. The metal-air battery according to claim 7, wherein the mark is a water level line.

11. The metal-air battery according to claim 7, wherein the cover includes water supply handles.

12. The metal-air battery according to claim 11, wherein the water supply handles are disposed in respective approximately centers of an opposing left side portion and right side portion of the cover, or the water supply handle disposed in the left side portion is positioned to one side with respect to a center in a width direction of the left side portion, and the water supply handle disposed in the right side portion is positioned to another side on an opposite side to the one side with respect to a center in a width direction of the right side portion.

13. The metal-air battery according to claim 1, wherein the metal-air battery comprises a salt for preparing a salt water as the electrolyte, and the salt has a grain diameter of 300 μm or less.

14. The metal-air battery unit according to claim 1, wherein the unit main body has a top surface side on which one upper case and another upper case are installed, and the water supply space is disposed in the one upper case, and the electrical system space is disposed in the other upper case.

* * * * *